Figure 1:
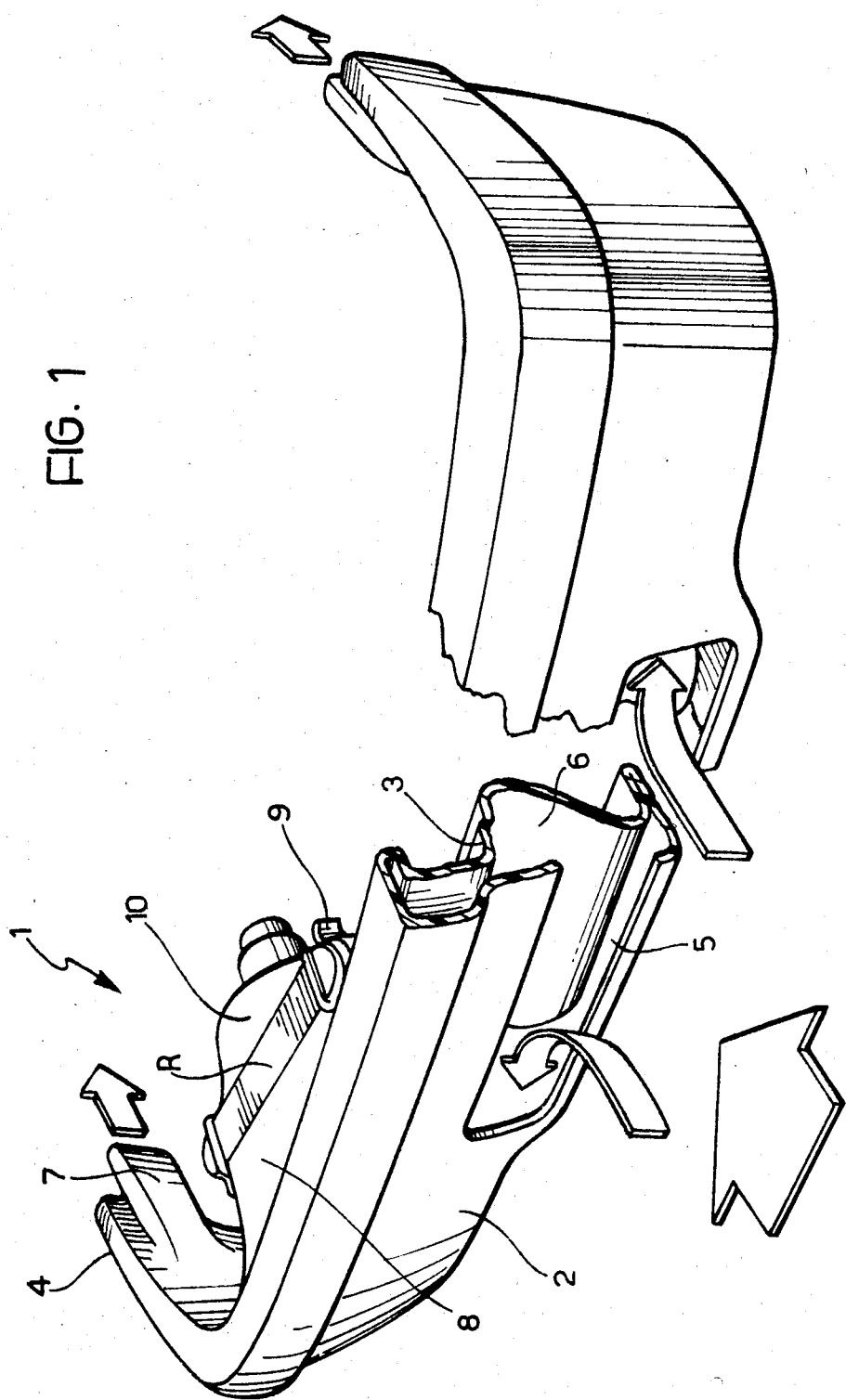

United States Patent [19]

Di Giusto

[11] Patent Number: 4,653,788
[45] Date of Patent: Mar. 31, 1987

[54] FRONT BUMPER FOR MOTOR VEHICLES

[75] Inventor: Nevio Di Giusto, Venaria, Italy

[73] Assignee: Fiat Auto S.p.A., Italy

[21] Appl. No.: 819,551

[22] Filed: Jan. 17, 1986

[51] Int. Cl.⁴ .............................................. B60R 19/02
[52] U.S. Cl. ..................................... 293/117; 296/1 S
[58] Field of Search ......................... 293/117; 296/1 S; 180/68.6

[56] References Cited

U.S. PATENT DOCUMENTS 4,567,955 2/1986 Baravalle .......................... 293/117

FOREIGN PATENT DOCUMENTS 2258288 8/1975 France .

Primary Examiner—Robert R. Song
Attorney, Agent, or Firm—Sughrue, Mion, Zinn, Macpeak, and Seas

[57] ABSTRACT

A front bumper for motor vehicles comprises a hollow body having at least one frontal inlet aperture acting as an air intake, and two rear end apertures defined by nozzles arranged to direct respective air flows towards the brakes for the front wheels of the vehicle. The cavity within the body also communicates with a rear tubular appendage acting as a duct for conveying an air flow towards the radiator of the vehicle engine.

2 Claims, 2 Drawing Figures

FRONT BUMPER FOR MOTOR VEHICLES

The present invention relates to front bumpers for motor vehicles, of the type comprising a hollow body with a front face having at least one inlet aperture acting as an air intake for admitting air to the central part of the cavity of the body, and rear apertures for the outlet of air from the ends of the cavity of the body.

A front bumper of the type defined above is known, for example, from French Pat. No. 2,258,288, in which the air leaving the rear end apertures of the body is used to counter the sprays of water and mud raised by the centrifugal force of the wheels in motion.

The object of the present invention is to provide a bumper of the type defined at the beginning, in which the conveying action achieved by the cavity of the body is useable more effectively and for purposes directly connected to the functioning of the vehicle to which the bumper is fitted in use.

In order to achieve this object, the present invention provides a front bumper for motor vehicles of the type defined at the beginning, characterised in that the rear apertures of the body are defined by respective nozzles formed in the body and arranged to direct respective air flows towards the brakes of the front wheels of the vehicle, and in that the body also has a rear tubular appendage communicating with the cavity and acting as a duct for conveying an air flow towards the heat exchanger for cooling the liquid coolant of the engine.

By virtue of this characteristic, the bumper according to the invention allows the air admitted in use to the cavity in the body to be used effectively to achieve a naturally-forced ventilation, that is without the need to have recourse to auxiliary energy sources, for the front brakes and the radiator of the vehicle on which the bumper is mounted in use.

According to the invention, the rear tubular appendage of the body acts conveniently as a support and ducting member for the heat exchanger.

Preferably, the body of the bumper is of plastics material and the nozzles and rear tubular appendage are formed integrally by moulding with the body itself.

Figure 2:
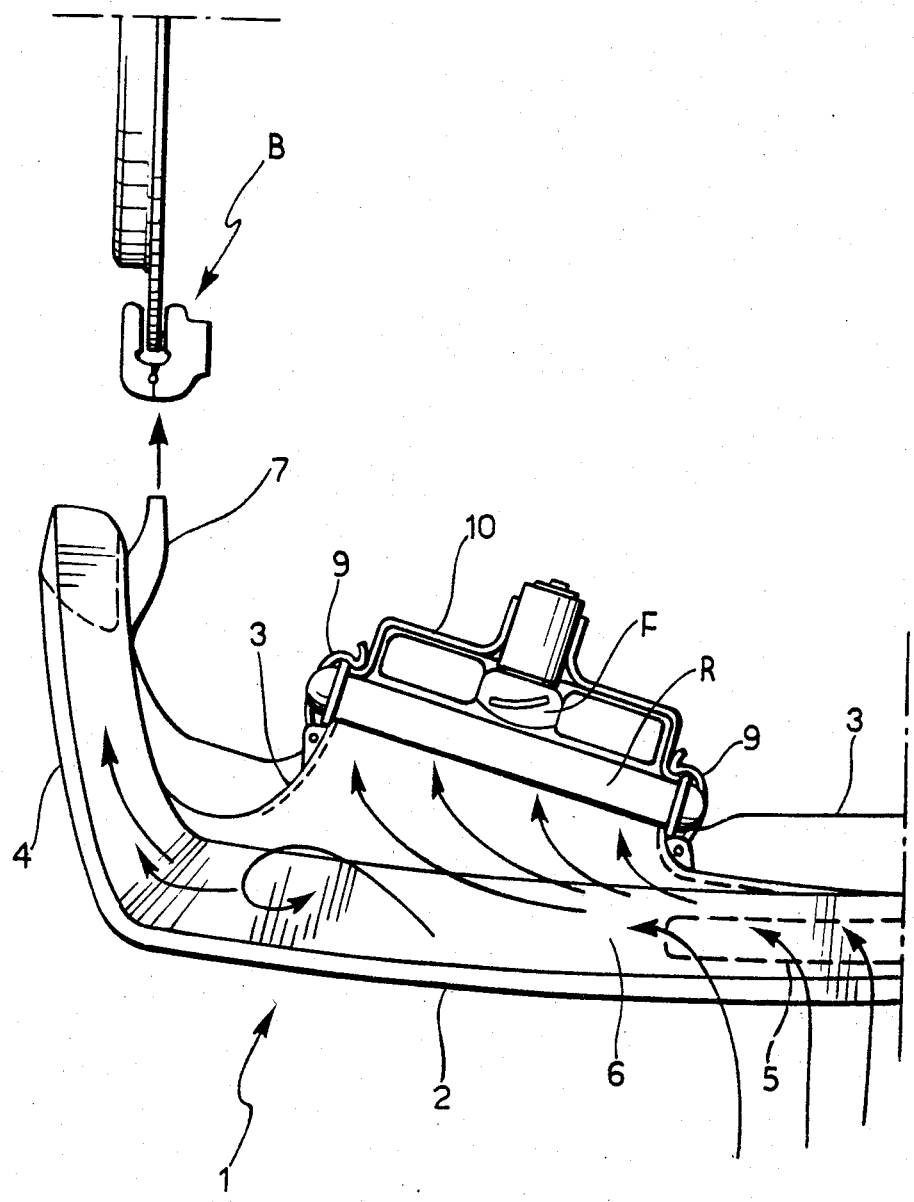

Further characteristics and advantages of the invention will become evident during the detailed description which follows with reference to the appended drawings, provided purely by way of non-limiting example, in which:

FIG. 1 is a partially sectioned perspective view of a front bumper for motor vehicles according to the invention, and FIG. 2 is a view of part of the bumper in longitudinal section.

In the drawings, a motor vehicle front bumper, generally indicated 1, is normally made from plastics material by a conventional moulding technique, for example by blow moulding.

The bumper has a generally conventional configuration and is constituted by a hollow body with a front face 2 and a rear face 3 appropriately shaped in accordance with structural and aesthetic requirements, and end parts 4 bent rearwardly, that is from the rear wall 3.

The bumper 1 has conventional attachment members, not shown in the drawings, for fixing it to the front part of the body of a motor vehicle with a liquid-cooled front engine, in a position forward of the engine compartment and with the ends 4 bent towards the rear wheels of the vehicle.

A central inlet aperture 5 is formed in the front wall 2 through which air is admitted to the cavity in the body, indicated 6, during movement of the vehicle on which the bumper 1 is mounted.

A hollow tubular appendage 7 shaped like a nozzle is formed on the inner side of each of the bent ends 4 and communicates with the cavity 6 in the body. The arrangement of the nozzles 7, which are conveniently formed integrally during the actual moulding of the bumper 1, is such that, in the mounted condition, they face the brakes of the front wheels of the vehicle, one of which is schematically indicated B in FIG. 2.

Furthermore, the rear wall 3 is formed with a rear tubular appendage 8, also formed integrally by moulding with the body 1, which opens into the cavity 6 and is arranged for the insertion and retention of a conventional radiator R for cooling the liquid coolant of the engine. In the embodiment illustrated, the radiator R is fixed to the tubular appendage 8 by resilient retaining members 9 so as to be, in practice, ducted within the tubular appendage 8. A conventional cooling fan F is associated with the radiator R and is also conveniently supported on the appendage 8 by means of a housing 10 fixed to the appendage by the same resilient retaining members 9.

In operation, the air entering the cavity 6 in the bumper 1 during movement of the vehicle is divided into two flows which are directed towards the bent ends 4 and discharged through the nozzles 7 which direct these flows under pressure towards the brakes B of the front wheels. Thus, constant and effective forced cooling of these brakes B is achieved without recourse to appropriate auxiliary cooling members.

One part of the air flow channelled into the cavity 6 is directed into the rear tubular appendage 8 to achieve a naturally forced ventilation of the radiator R. This ventilation is rendered extremely effective by the fact that, as stated above, the radiator R is in practice ducted within the appendage 8.

Naturally, the constructional details and forms of embodiment may be varied widely with respect to that described and illustrated, without thereby departing from the scope of the present invention as defined in the following claims.

What is claimed is:

1. A front bumper for a motor vehicle having a liquid cooled front engine, a heat exchanger for cooling the liquid coolant, and front wheels provided with brakes, the bumper comprising a hollow body defining a cavity and having a front face with at least one inlet aperture acting as an air intake for admitting air to the central part of the cavity of the body, and rear apertures for the outlet of air from the ends of the cavity of the body, wherein the improvements consist in the rear apertures being defined by respective nozzles formed in the body and arranged to direct respective air flows towards the brakes of the front wheels of the vehicle, and the body also having a rear tubular appendage which communicates with the cavity and acts as a support for the heat exchanger and as a duct for conveying an air flow towards the heat exchanger for cooling the liquid coolant of the engine.

2. A bumper as defined in claim 1, wherein the body is of plastics material and the nozzles and rear tubular appendage are formed integrally by moulding with the body.

* * * * *